US010916046B2

United States Patent
Guay et al.

(10) Patent No.: US 10,916,046 B2
(45) Date of Patent: Feb. 9, 2021

(54) JOINT ESTIMATION FROM IMAGES

(71) Applicant: Disney Enterprises, Inc., Burbank, CA (US)

(72) Inventors: Martin Guay, Zurich (CH); Dominik Tobias Borer, Dübendorf (CH); Ahmet Cengiz Öztireli, Zurich (CH); Robert W. Sumner, Zurich (CH); Jakob Joachim Buhmann, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 0 days.

(21) Appl. No.: 16/289,441

(22) Filed: Feb. 28, 2019

(65) Prior Publication Data
US 2020/0279428 A1 Sep. 3, 2020

(51) Int. Cl.
*G06T 13/40* (2011.01)
*G06T 7/73* (2017.01)
*G06T 11/00* (2006.01)

(52) U.S. Cl.
CPC ............ *G06T 13/40* (2013.01); *G06T 7/73* (2017.01); *G06T 11/001* (2013.01); *G06T 2207/20084* (2013.01)

(58) Field of Classification Search
CPC .............. G06T 11/001; G06T 2207/20084
See application file for complete search history.

(56) References Cited

U.S. PATENT DOCUMENTS

| 10,373,023 | B1 * | 8/2019 | Kim ..................... G06N 3/0454 |
| 2004/0095344 | A1 * | 5/2004 | Dojyun .................. G06N 3/004 345/419 |
| 2008/0219538 | A1 * | 9/2008 | Gering .................... G06T 15/04 382/132 |
| 2009/0079743 | A1 * | 3/2009 | Pearson .................. G06T 13/20 345/473 |

(Continued)

OTHER PUBLICATIONS

Zuffi, S., Kanazawa, A., Jacobs, D., Black, M. "3D Menagerie: Modeling the 3D Shape and Pose of Animals", The IEEE Conference on Computer Vision and Pattern Recognition (CVPR) 2017, 9 pages.

(Continued)

*Primary Examiner* — Phi Hoang
(74) *Attorney, Agent, or Firm* — Patterson + Sheridan, LLP

(57) ABSTRACT

Techniques are disclosed for estimating poses from images. In one embodiment, a machine learning model, referred to herein as the "detector," is trained to estimate animal poses from images in a bottom-up fashion. In particular, the detector may be trained using rendered images depicting animal body parts scattered over realistic backgrounds, as opposed to renderings of full animal bodies. In order to make appearances of the rendered body parts more realistic so that the detector can be trained to estimate poses from images of real animals, the body parts may be rendered using textures that are determined from a translation of rendered images of the animal into corresponding images with more realistic textures via adversarial learning. Three-dimensional poses may also be inferred from estimated joint locations using, e.g., inverse kinematics.

20 Claims, 7 Drawing Sheets

(56) References Cited

U.S. PATENT DOCUMENTS

| | | | |
|---|---|---|---|
| 2011/0069888 A1* | 3/2011 | Lim | G06K 9/00369 |
| | | | 382/190 |
| 2014/0274373 A1* | 9/2014 | Olshan | G06T 13/40 |
| | | | 463/31 |
| 2016/0143524 A1* | 5/2016 | Berard | A61B 3/103 |
| | | | 351/206 |
| 2018/0124387 A1* | 5/2018 | Zhao | H04N 17/002 |
| 2018/0353836 A1* | 12/2018 | Li | A63B 71/06 |
| 2019/0080206 A1* | 3/2019 | Hotson | G06K 9/6264 |
| 2019/0172224 A1* | 6/2019 | Vajda | G06T 7/77 |
| 2019/0370666 A1* | 12/2019 | Ros Sanchez | G06N 3/088 |

OTHER PUBLICATIONS

Mueller, F., Bernard, F., Sotnychenko, O., Mehta, D., Sridhar, S., Casas, D., Theobalt, C., "GANerated Hands for Real-Time 3D Hand Tracking from Monocular RGB", (2017), 13 pages.

Biggs, B., Roddick, T., Fitzgibbon, A., Cipolla, R. "Creatures Great and SMAL: Recovering the shape and motion of animals from video" (ACCV 2018), 17 pages.

Zuffi, S., Kanazawa, A., Black, Michael, "Lions and Tigers and Bears: Capturing Non-Rigid, 3D, Articulated Shape from Images", The IEEE Conference on Computer Vision and Pattern Recognition (CVPR), 2018, pp. 3955-3963.

Varol, G., Romero, J., Martin, X., Mahmood, N. Black, M., Laptev, I., Schmid, C., "Learning from Synthetic Humans", CVPR 2017, 10 pages.

Shih-En Wei, Varun Ramakrishna, Takeo Kanade, Yaser Sheikh, "Convolutional Pose Machines", CVPR 2016, 9 pages.

Matthias Dantone, Juergen Gall, Christian Leistner. Luc Van Gool. "Human Pose Estimation Using Body Parts Dependent Joint Regressors." IEEE Conference on Computer Vision and Pattern Recognition (CVPR), 2013, 8 pages.

* cited by examiner

A

B

JOINT ESTIMATION FROM IMAGES

BACKGROUND

Field

This disclosure provides techniques for estimating joints of animals and other articulated figures in images.

Description of the Related Art

Three-dimensional (3D) animal motions can be used to animate 3D virtual models of animals in movie production, digital puppeteering, and other applications. However, unlike humans whose motions may be captured via marker-based tracking, animals do not comply well and are difficult to transport to confined areas. As a result, marker-based tracking of animals can be infeasible. Instead, animal motions are typically created manually via key-framing.

SUMMARY

One embodiment disclosed herein provides a computer-implemented method for identifying poses in images. The method generally includes rendering a plurality of images, where each of the plurality of images depicts distinct body parts of at least one figure, and each of the distinct body parts is associated with at least one joint location. The method further includes training a machine learning model using, at least in part, the plurality of images and the joint locations associated with the distinct body parts in the plurality of images. In addition, the method includes processing a received image using, at least in part, the trained machine learning model which outputs indications of joint locations in the received image.

Another embodiment provides a computer-implemented method for determining texture maps. The method generally includes converting, using adversarial learning, a plurality of rendered images that each depicts a respective figure to corresponding images that include different textures than the rendered images. The method further includes extracting one or more texture maps based, at least in part, on (a) textures of the respective figures as depicted in the corresponding images, and (b) pose and camera parameters used to render the rendered images.

Another embodiment provides a computer-implemented method for extracting poses from images. The method generally includes receiving one or more images, each of the one or more images depicting a respective figure. The method further includes processing the one or more images using, at least in part, a trained machine learning model which outputs indications of joint locations in the one or more images. In addition, the method includes inferring a respective skeleton for each image of the one or more images based, at least in part, on the joint locations in the image.

Other embodiments include, without limitation, a computer-readable medium that includes instructions that enable a processing unit to implement one or more embodiments of the above methods, as well as a system configured to implement one or more aspects of the above methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
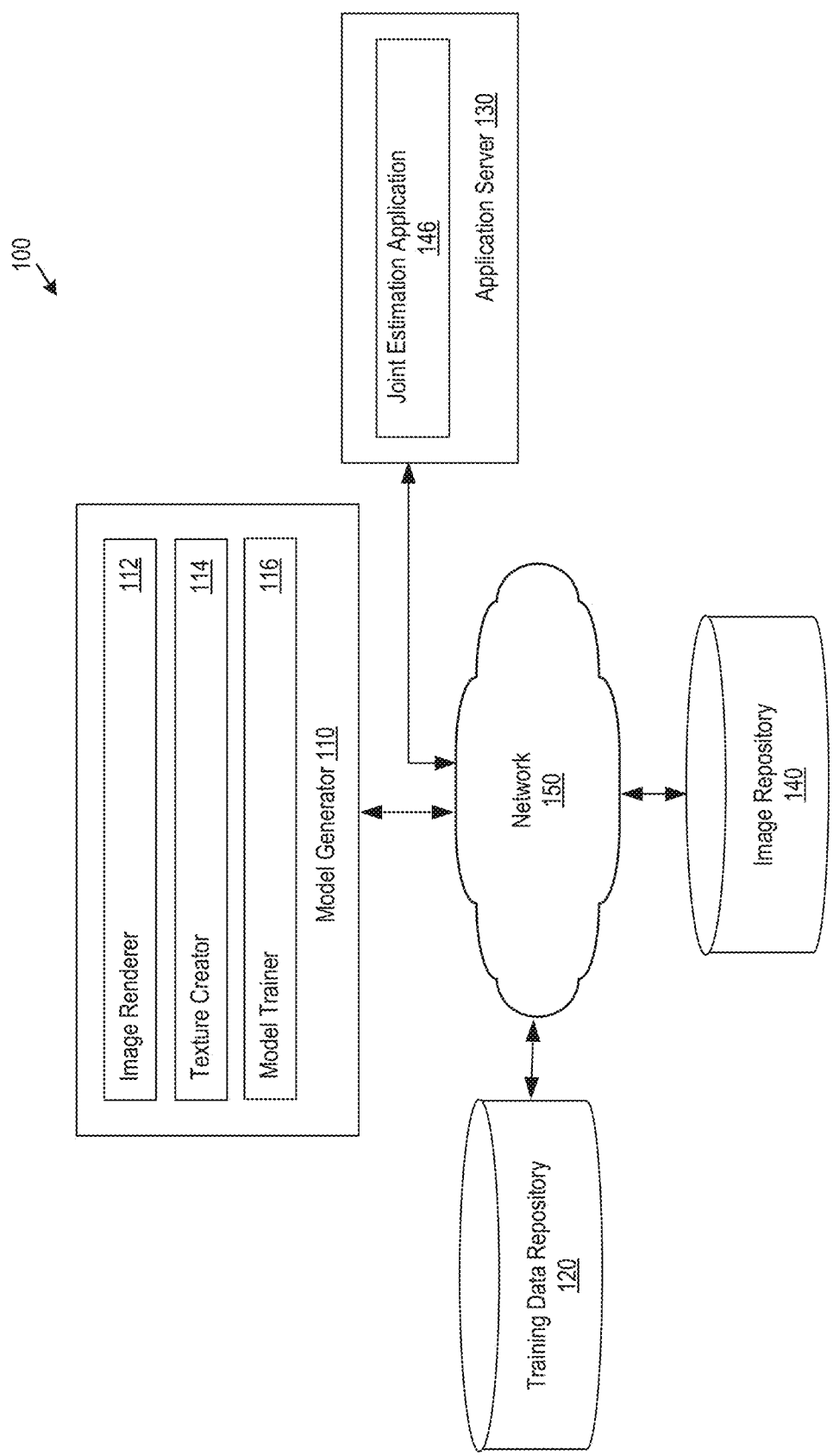
FIG. 1 illustrates an example networked environment in which machine learning models are trained and deployed for estimating poses in images.

Embodiments presented herein provide techniques for estimating poses from images. Animals are used herein as a reference example, but techniques disclosed herein may also be used to estimate poses of other articulated figures, such as humans, that are depicted in images. Animals do not wear clothes and have textures that vary less than humans, suggesting a synthetic annotated data set can be generated for training an animal pose detector by rendering a three-dimensional (3D) virtual model of the animal in various poses. However, large data sets of 3D animal motions do not exist, and it is difficult to create plausible animal poses by hand. A data set of animal motions may be created by rendering only a small set of possible motions, but doing so induces a bias toward a few poses such that a trained pose detector cannot track motions outside of the initial data set. One embodiment instead trains an animal pose detector to estimate animal poses from images in a bottom-up fashion so as to avoid pose distribution bias and inducing a quadruped structure. In such a case, the detector may be trained using rendered images depicting animal body parts scattered over realistic backgrounds in different locations, orientations, and scales, as opposed to renderings of full animal bodies. In order to make appearances of the rendered body parts more realistic so that the detector can be trained to estimate poses from images of real animals, the body parts may be rendered using textures that are determined from a translation of rendered images of the animal into corresponding images with more realistic textures via adversarial learning. Once trained, the detector may be used to process images depicting the animal in order to estimate joint locations therein, together with confidence values for the estimates. 3D poses may then be inferred from the joint locations using, e.g., inverse kinematics.

In the following, reference is made to embodiments of the invention. However, it should be noted that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of the present invention, a user may access applications (e.g., a joint estimation application) or related data available in the cloud. For example, a joint estimation application could execute on a computing system in the cloud to recognize joints and poses in images, and store the recognized joints and poses at a storage location in the cloud. Doing so allows a user to access this information from any computing system attached to a network connected to the cloud (e.g., the Internet).

FIG. 1 illustrates an example networked environment 100 in which machine learning models are trained and deployed for estimating poses in images, according to an embodiment. As shown, the networked environment 100 includes a model generator 110, a training data repository 120, an application server 130, and a video repository 140 communicatively connected via a network 150.

The model generator 110 is generally representative of a computing system, such as the system discussed below with respect to FIG. 7. As shown, the model generator 110 includes an image rendering application ("image renderer") 112, a texture creation application ("texture creator") 114, and a model training application ("model trainer") 116 running therein. Although shown as being distinct, in some embodiments the image renderer 112, texture creator 114, and/or model trainer 116 may be implemented as a single application. The image renderer 112 is configured to render images depicting 3D virtual scenes and, in particular, images of synthetic animals that are rendered using texture maps that do not appear realistic, which are also referred to herein as "synthetic images." Well-known rendering techniques may be employed by the image renderer 112, as discussed in greater detail below.

The model trainer 116 is configured to train machine learning models, which in one embodiment includes a model for translating synthetic images of animals rendered by the image renderer 112 into versions of those images with realistic textures, from which the texture creator 114 may generate realistic texture maps for the animals. In addition, the model trainer 116 trains, using images depicting mosaics of body parts rendered with the realistic texture maps and associated joint locations, a detector machine learning model for predicting key points representing joint locations in input images of the animal, as discussed in greater detail below. Training data, including the images depicting real animals used to train the model that translates synthetic images to realistic versions of those images and the images depicting mosaics of body parts used to train the detector, may be stored in the training data repository 120 (or elsewhere).

The application server 130 is generally representative of another computing system, the components of which may be similar to those of the model generator 110. As shown, the application server 130 includes a joint estimation application 146 running therein. In one embodiment, the joint estimation application 146 is configured to extract poses of animals depicted in input images using a trained detector to predict the 2D locations of key points representing joints in the input images and infer (e.g., via inverse kinematics) a 3D skeleton from the prediction joint locations. As used herein, a "skeleton" refers to a hierarchical set of interconnected bones that can be used to animate 3D virtual geometries (i.e., 3D models). In particular, skeletons parameterize poses, and a skeleton can be modified to deform an associated 3D model. The images input into the trained detector may include individual images and/or image frames of a video, which as shown are stored in and retrieved by the joint estimation application 146 from an image repository 140 (but may also be stored elsewhere).

Figure 2:
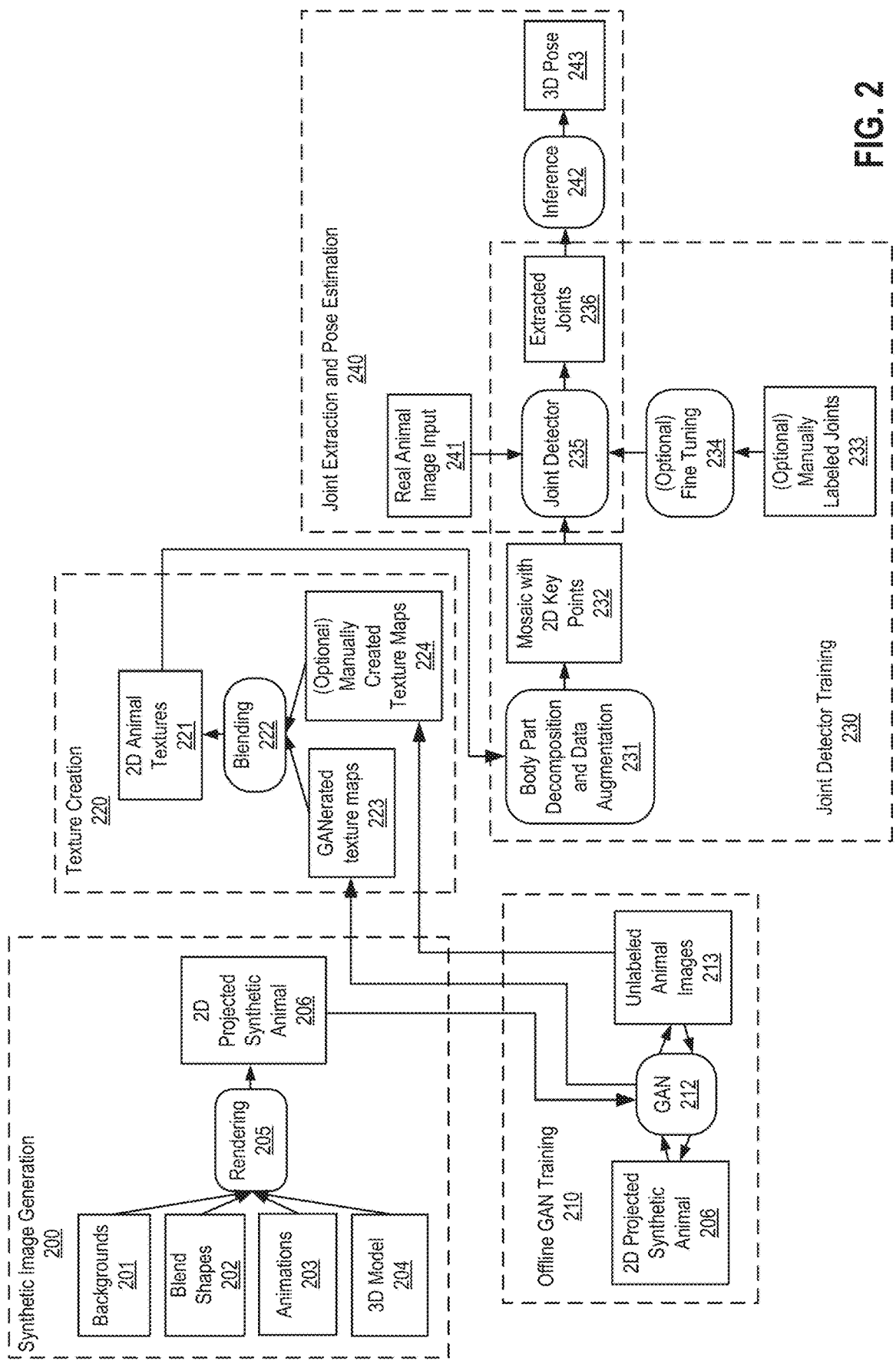
FIG. 2 illustrates an approach for training and using a machine learning model to track joint locations, according to an embodiment.

FIG. 2 illustrates an approach for training and using a machine learning model to track joint locations, according to an embodiment. As shown, during synthetic image generation 200, the image renderer 112 performs rendering 205 with a 3D model 204 of an animal that is imported into a 3D virtual scene, one or more animations 203 (e.g., walk and run cycles) used to pose the 3D model 204, blend shapes 202 used to deform the 3D model 204 and introduce variability, and background images 201 depicting realistic scenery. The rendering 205 composes the 3D model 204, poses from the animations 203, deformations caused by the blend shapes 202, and the background images 201 together to produce 2D images 206 depicting a projected synthetic animal with realistic backgrounds. In one embodiment, a virtual camera may be used to capture the 3D model 204 from different viewpoints, such as various side views of the 3D model 204, and backgrounds.

Figure 3:
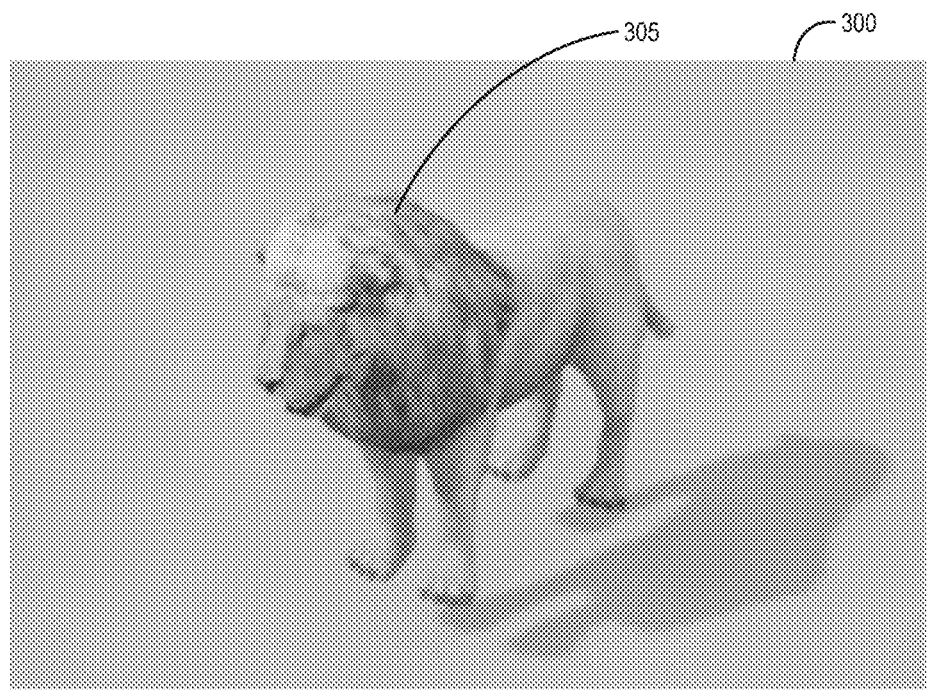
FIG. 3 illustrates examples of a synthetic image and realistic versions of images generated artificially using a neural network function, according to an embodiment.
Figure 3:
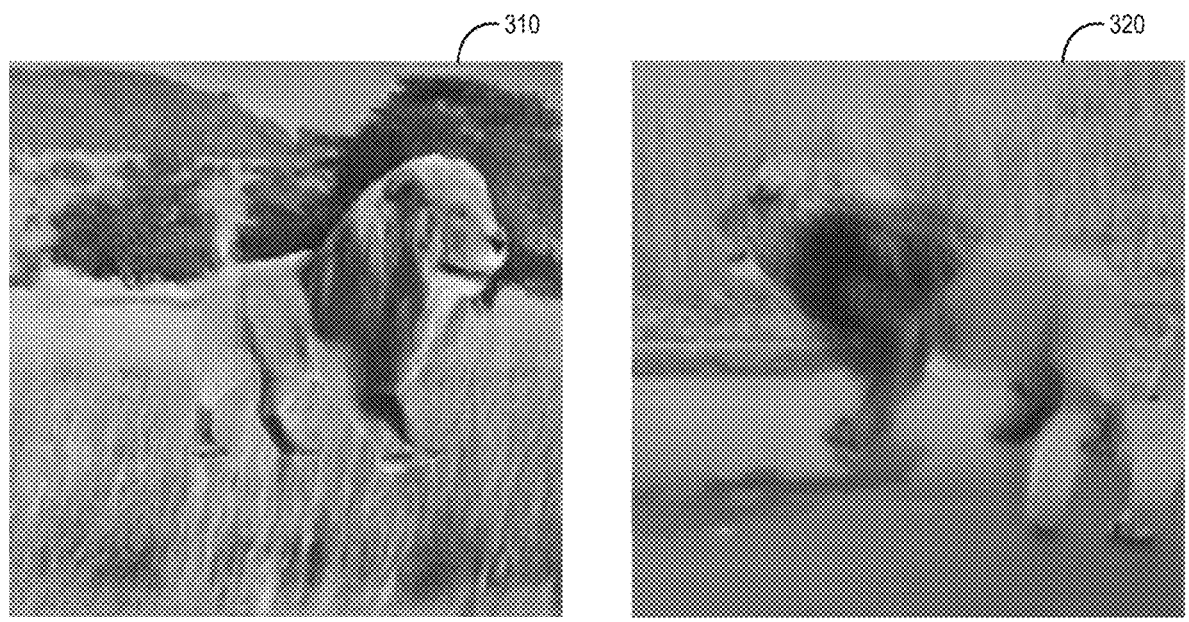

Panel A of FIG. 3 illustrates an example image 300 of a synthetic lion 305 rendered without a background. In particular, the rendering is of a 3D mesh, textured and parameterized by a skeleton via linear blend skinning. Illustratively, the synthetic lion 305 includes a texture that does not appear realistic, as an unrealistic texture map (e.g., a manually created texture) was used during rendering of the image 300. The unrealistic texture map may be a rough approximation of a texture having a realistic appearance. It should be understood that an artist can create a very realistic animal texture, but doing so may take a long time and may still differ from reality given that texture is only part of a more complex computational rendering of the animal into an image. Another drawback of a manually created texture is variations in texture must be created manually, which does not scale well. For a learned model to generalize to different animals, the model needs to learn from many variations (i.e., the model needs to see many different textures during training). Although the image 300 has been rendered without a background, it should be understood that rendered images may generally include backgrounds depicting realistic scenery.

Directly rendered images of synthetic animals (e.g., the image 300 described above depicting the synthetic lion 305) may not appear realistic compared to images depicting real animals (e.g., an image depicting a real-world lion). As a result, a detector trained to estimate joint locations using such images of a synthetic animal may not perform well when applied to estimate joint locations in images depicting the real animal. That is, there is a reality gap problem. One embodiment solves such a problem by translating the synthetic images to corresponding images that appear more realistic using adversarial learning, generating textures of the animal using the more realistic images, and training a detector to predict joint locations using images that depict body parts of the animal rendered with the generated textures and associated joint locations. Returning to FIG. 2, during offline generative adversarial network (GAN) training 210, the synthetic images 206 and unlabeled animal images 213 are used to train a GAN 212 including a neural network function, specifically a generative function, that may be used to artificially generate realistic versions of the synthetic images 206 by modifying textures therein into more realistic textures that are similar to the textures in the unlabeled animal images 213. The offline GAN training 210 uses a big data set (of synthetic images and images depicting real animals) to obtain realistic animal textures, which may help eliminate texture bias, while keeping the animal poses in the synthetic images 206 unchanged.

Illustratively, the adversarial training trains a CycleGAN 212 using the synthetic images 206 of an animal (e.g., a lion) as well as unlabeled real-world images 213 of the same animal, and a generative function of the CycleGAN 212 is trained to generate realistic versions of the synthetic images 206. A CycleGAN is a GAN architecture useful for learning a mapping from one domain (e.g., that of the synthetic images 206) to another (e.g., that of the unlabeled real-world images 213) with unpaired training data. In particular, the CycleGAN 212 may include a generative function, also referred to herein as a "generator," for mapping input images in one domain to output images in another domain and a discriminative function, also referred to herein as a "discriminator," that encourages the generator to create outputs indistinguishable from a desired data distribution domain, as well as another generator and discriminator pair for the reverse mapping. Images generated using a GAN such as the CycleGAN 212 are also sometimes referred to as "GANerated" images. The training of the CycleGAN 212 is loosely supervised, with no correspondence required between the 2D projected synthetic images 206 and the unlabeled images 213 of animals that are used as training data. Any suitable training algorithm may be employed, such as the Adam optimization algorithm.

Panel B of FIG. 3 illustrates examples of images 310 and 320 artificially generated using a neural network function. Illustratively, the images 310 and 320 each depict a lion with a realistic texture. In one embodiment, the images 310 and 320 may be created by a generator after a CycleGAN including the generator is trained using synthetic and real images (and the synthetic images and random noise are then input into the generator). In such a case, the generator of the CycleGAN may modify the texture of animals depicted in the synthetic images (and backgrounds of those images as the CycleGAN may be agnostic as to what the animals are) to appear more realistic.

Returning to FIG. 2, after the offline GAN training 210, the texture creator 114 extracts GANerated texture maps 223 from the artificially generated realistic versions of the synthetic images 206. It should be understood that the artificially generated realistic images depict realistic looking animals for which pose and camera parameters are known, as those pose and camera parameters were used to render the corresponding synthetic images 206. That is, the offline GAN training 210 process essentially creates a supervised setting with known poses, which was traditionally unavailable for animals that are less docile than humans and cannot be made to assume certain poses in a controlled environment. The texture creator 114 makes use of the known pose and camera parameters to generate the GANerated texture maps 223 by, e.g., placing the synthetic animal over the artificially generated one for each synthetic image and artificially generated realistic image pair and extracting the texture map from the artificially generated realistic image. That is, assuming the 3D model of the animal is rendered from a side view with known pose and camera parameters, the location of the 3D animal model in each artificially generated realistic image is known and, as the 3D model is being projected from a known virtual camera position, the texture of the animal can be recovered from the artificially generated realistic image. Further, as each of the artificially generated realistic images may show only one side of the animal (because the synthetic images were originally rendered from the sides of the animal), the texture creator 114 may mirror the animal texture in the artificially generated realistic images, i.e., generating the GANerated texture maps 223 may include such mirroring. Any number of texture maps (e.g., 3 to 100) may be generated in this manner. It should be understood that multiple texture maps may provide variations in textures, reflecting the different appearances of animals in the real world and permitting a detector to be trained to detect joint locations in images depicting such animals.

Illustratively, the texture creator 114 blends the GANerated texture maps 223 to generate 2D animal textures 221 that can be used to re-texture the 3D model of the animal. In one embodiment, the texture creator 114 may employ linear blending, in which case linear weighted sums of randomly selected GANerated texture maps 223 may be determined. Optionally, manually-created texture maps 224 may also be blended with the GANerated texture maps 223 if such manually-created texture maps 224 are available (e.g., if a user manually created texture maps from the unlabeled animal images 213). Blending multiple a priori extracted texture maps with each other and (optionally) with manually created texture maps allows diverse texture appearances to be created. It should be understood that small artifacts in the texture maps 221 may not significantly affect a trained detector if the training data set is sufficiently large and varied.

As shown, joint detector training 230 includes body part decomposition and data augmentation 231, during which the model trainer 116 (or another application such as the image renderer 112) uses the 2D animal textures 221 to render individual body parts of the animal with different positions, orientations, scales, noisiness, illumination, blurriness, occlusions, warpings, etc. over a background. Body parts and associated joints of a 3D animal model may be manually defined. In one embodiment, for a 3D model of an animal having a skeleton embedded therein, with the 3D model being parameterized by the skeleton in linear blend skinning, the user may specify skeletal joints as belonging to particular body parts (e.g., a knee joint belongs to a leg), and vertices of the 3D model geometry that are mapped to those joints in linear blend skinning may be assigned to the body parts (i.e., the vertices mapped to joints associated with body parts are made into the body parts).

Figure 4:
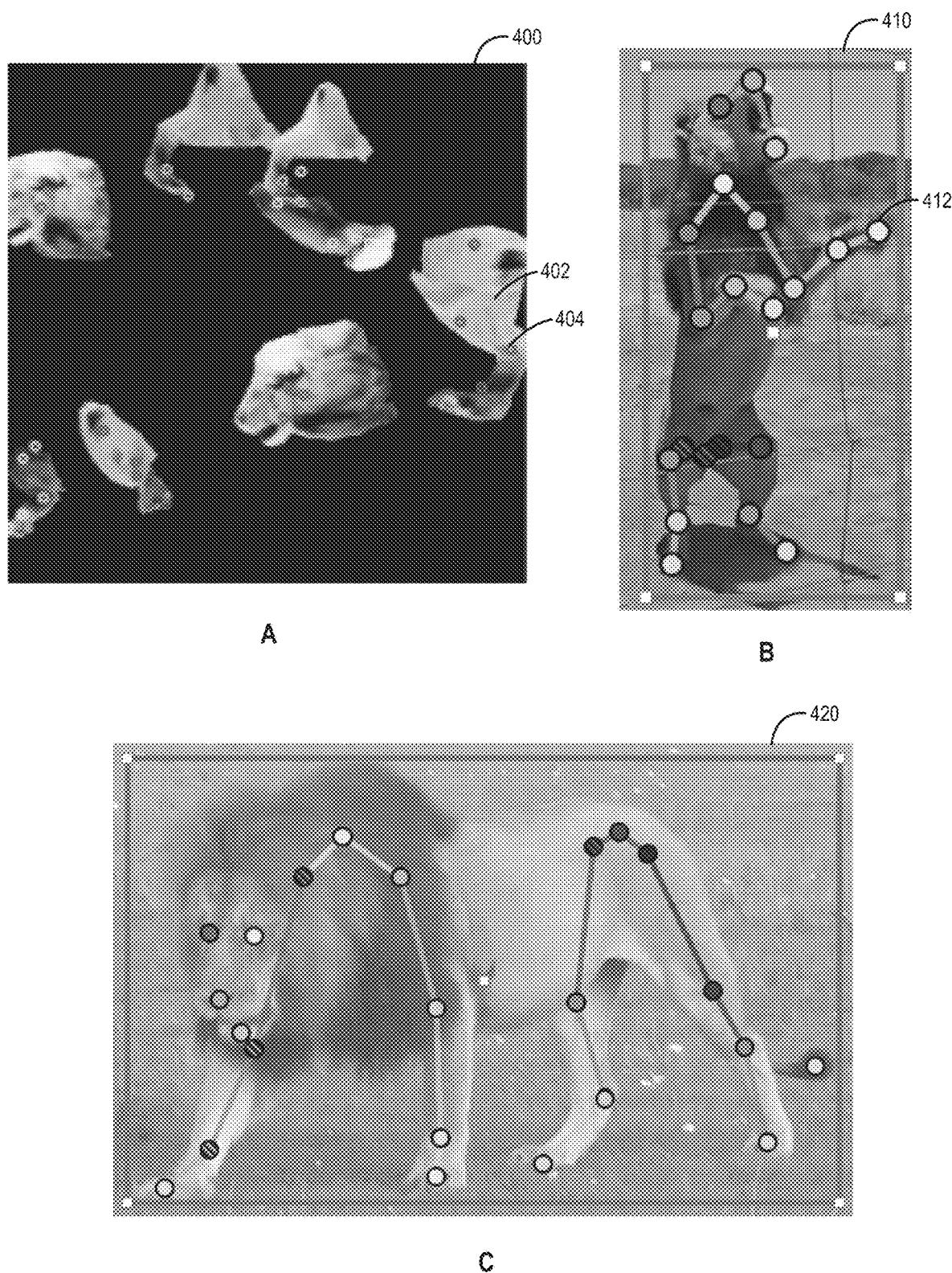
FIG. 4 illustrates examples of an image depicting a mosaic of body parts, an image with manually labeled joint locations, and an image in which key points representing joints have been detected, according to an embodiment.

The animal is decomposed and rendered as such body parts, rather than a full body, at random locations within the image, and data augmentation may also be employed by, e.g., adding noise, rotating the body parts, scaling the body parts, warping the body parts, adding occlusions, changing lighting, etc. The result is a set of images depicting mosaics of body parts, which are also labeled with joint locations that are known based on the mapping of the 3D body parts and associated joints to two dimensions. It should be understood that the images themselves are not directly labeled; rather, as used herein, a "label" refers to a description of a feature that should be predicted, in this case a location of a joint which is associated with the image(s). The 3D model of the animal may be placed in different poses to provide some variability, and then cut into body parts for further variability. Rendering body parts, as opposed to full body poses, may help eliminate pose bias, as the detector can be trained to detect individual body parts in a manner that is agnostic to the overall pose of an animal, as opposed to detecting the animal in particular poses. The detector may then be able to detect various motions such as jumping, laying on the ground, getting up from the ground, etc. that the detector is not explicitly trained to identify. Panel A of FIG. 4 shows an example image 400 in which body parts of a lion (e.g., a leg 402) have been rendered using the 2D animal textures 221 that appear realistic, and labeled 2D key points indicating the locations of joints (e.g., joint 404).

Returning to FIG. 2, images depicting mosaics of body parts and labeled 2D key points 232 indicating joint locations therein are used as training data to train a joint detector 235. Once trained, the joint detector 235 takes images of an animal as input and predicts key points representing joint locations in those images. In one embodiment, the joint detector 235 may be a multi-stage hourglass deep neural network that predicts key points representing 2D joint locations from 2D red-green-blue (RGB) images, together with a confidence value for each predicted joint location. An hourglass deep neural network is a neural network architecture with an hourglass shape that takes images as input, compresses the images to a bottleneck, and expands out from the bottleneck, in several stages (e.g., 5 or 6 stages). Other types of machine learning models, such as a convolutional pose machine, may be used in lieu of an hourglass deep neural network in alternative embodiments. Given an input image, the trained joint detector 235 in one embodiment may output a heat map for each joint indicating, at each pixel location, a likelihood that the joint is located at that pixel location. Although discussed herein primarily with respect to such heat maps, the joint detector 235 may generally output any indication of joint locations and/or skeletons in input images.

As shown, the model trainer 116 may (optionally) perform fine tuning 234 of the joint detector 235 using images with manually labeled joint locations 234, assuming such manually labeled data is available. Panel B of FIG. 4 shows an example image 410 depicting a lion and manually labeled joint locations, such as the location of joint 412. That is, a data set for the exact training purpose, including images depicting real animals and manually labeled joint locations, may be used to fine tune (i.e., perform additional training of) the joint detector 235 after the joint detector 235 has been trained using the images depicting mosaics of body parts and associated 2D key points 232.

Returning to FIG. 2, after the joint detector 235 is trained, an image 241 depicting a real animal may be input into the joint detector 235 during joint extraction and pose estimation 240. In turn, the joint detector 235 outputs key points indicating 2D joint locations 236 extracted from the real animal image 241. Although one real animal image 241 is shown for illustrative purposes, any number of images, such as the image frames of a video, may be processing using the trained joint detector 235.

In addition to extracting 2D joint locations, the joint estimation application 146 performs inference 242 using the joint locations 236 to build a 3D pose 243. In one embodiment, the 3D pose inference includes reconstructing a 3D pose by employing well-known optimization techniques where the 2D key points act as constraints in the 3D pose optimization process. Additionally, in the optimization process, kinematic constraints, as well as pose priors may be used to further constrain the pose space. Panel C of FIG. 4 shows example key points (e.g., key point 422) representing joints that have been detected in an image 420 of a lion, as well as a skeleton inferred from such joints via inverse kinematics.

Figure 5:
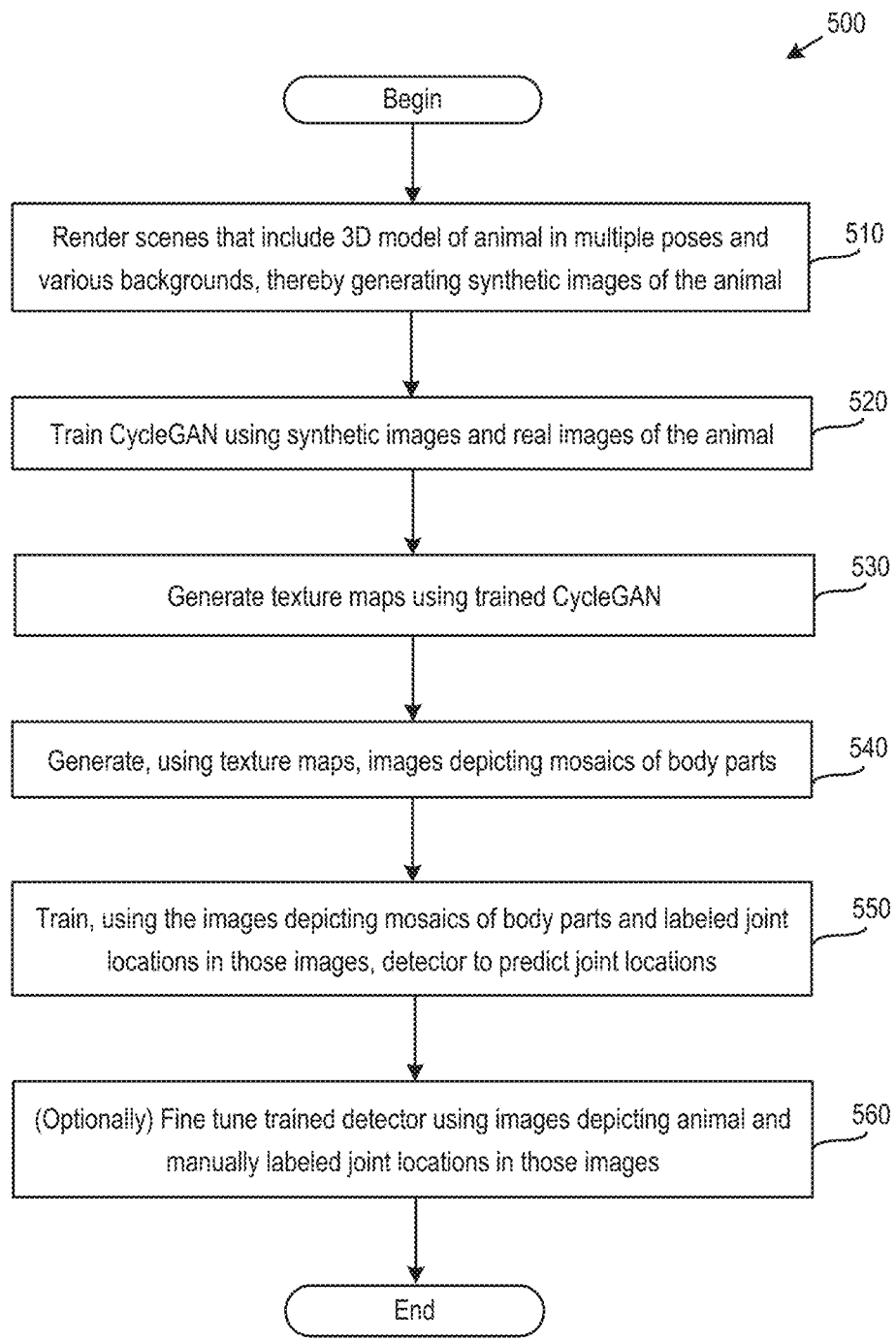
FIG. 5 illustrates a method for generating realistic animal textures and training a joint detector, according to an embodiment.

FIG. 5 illustrates a method 500 for generating realistic animal textures and training a joint detector, according to an embodiment. As shown, the method 500 begins at step 510, where the image renderer 112 renders scenes including a 3D model of an animal in multiple poses and various backgrounds, thereby generating synthetic images of the animal. Given the 3D model of the animal, animated poses, and (optionally) blend shapes for shape variation, the image renderer 112 may render images depicting a set of animal poses on natural-looking backgrounds (e.g., a lion on a savannah background). As described, the 3D model of the animal may be rendered using a texture map that is unrealistic, and the rendering may employ a virtual camera to capture the 3D model from different (side) viewpoints and backgrounds.

At step 520, the model trainer 116 trains a CycleGAN using the synthetic images and real images of the animal as training data. Once trained, such a CycleGAN is capable of translating the appearances of synthetic and real animals (as well as backgrounds) in images. Although CycleGAN is discussed herein as a reference example, other embodiments may use other machine learning models suitable for translating synthetic images to more realistic images.

At step 530, the texture creator 114 generates texture maps using the trained CycleGAN. In one embodiment, the texture creator 114 inputs the synthetic images rendered at step 510 (and random noise) into a generator of the CycleGAN that maps the synthetic images to more realistic versions of those images. Then, the texture creator 114 extracts, based on known pose and camera parameters that were used to generate the corresponding synthetic images from 3D virtual scenes including an animal model, texture maps for the animal. The extracted texture maps may also be blended with each other and (optionally) manually-created texture maps, as described above. Multiple texture maps may be generated in such a manner to ensure variations in textures, reflecting the different appearances of animals in the real world.

At step 540, the model trainer 116 generates images that each depicts a mosaic of body parts. Such images may include body parts of the animal model rendered with the texture maps generated at step 530 and randomly scattered on realistic backgrounds. In addition, the model trainer 116 may perform data augmentation, such as adding noise, rotating the body parts, scaling the body parts, warping the body parts, adding occlusions, changing lighting, etc.

At step 550, the model trainer 116 trains, using the images depicting mosaics of body parts and labeled locations of joints in those images, a detector that predicts joint locations. In one embodiment, the detector is a deep neural network, and in particular the detector may be the multi-stage hourglass deep neural network described above that is trained to predict key points representing 2D joint locations and associated confidence values. For example, the hourglass deep neural network may take as input pixel data of an image and output a heat map for each key point (joint). As described, a 3D skeleton may be inferred via, e.g., inverse kinematics from 2D joint locations determined using such a trained detector.

At step 560, the model trainer 116 (optionally) fine tunes the detector using images depicting the animal and manually labeled joint locations in those images, if such manually labeled data is available.

Figure 6:
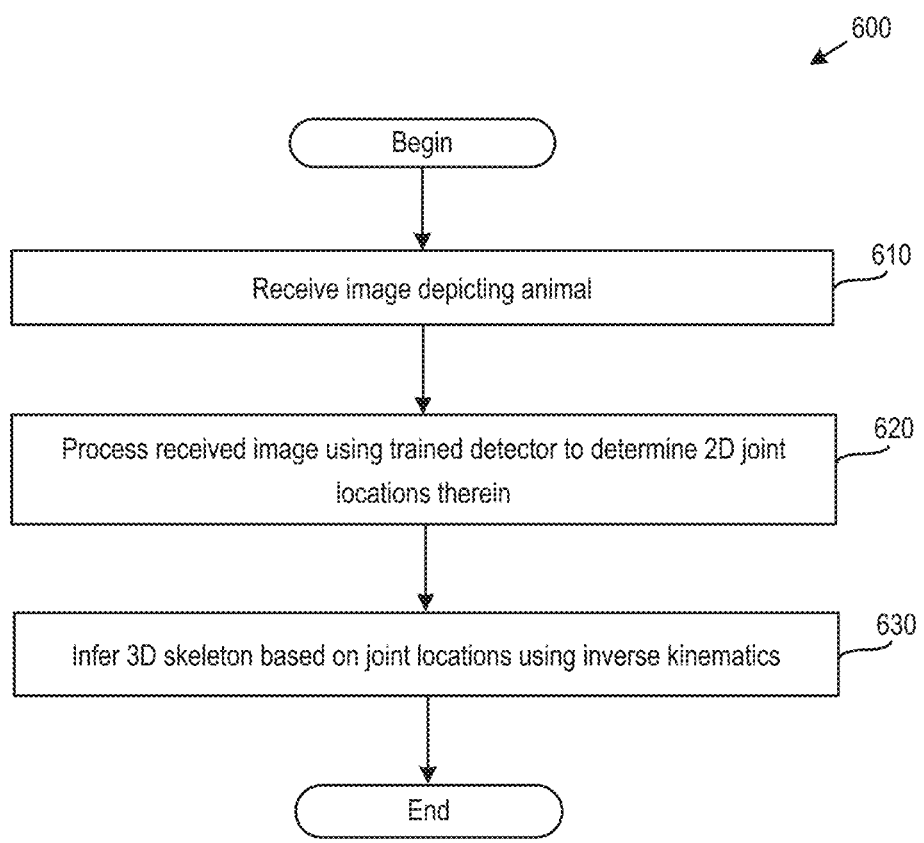
FIG. 6 illustrates a method for determining poses from images, according to an embodiment.

FIG. 6 illustrates a method 600 for determining a pose from an image, according to an embodiment. As shown, the method 600 begins at step 610, where the joint estimation application 146 receives an image depicting an animal. Although discussed for simplicity with respect to a single image, steps of the method 600 may also be repeated for multiple images, such as the image frames of a video that depicts an animal, in order to extract skeletons (and an overall animation) from the images.

At step 620, the joint estimation application 146 processes the received image using a trained detector to determine 2D joint locations therein. As described, the trained detector may, in one embodiment, be a multi-stage hourglass deep neural network that outputs respective heat maps for each key point representing a joint of the animal. In such a case, the heat map associated with a joint may indicate, for each pixel in the image, a likelihood that the joint is located at that pixel. To identify the joint using such a heat map, the joint estimation application 146 may, e.g., determine pixels where the likelihood indicated by the heat map exceeds a threshold value, and then take an average of the positions of the determined pixels.

At step 630, the joint estimation application infers a 3D skeleton based on the joint locations using inverse kinematics. In alternative embodiments, the skeleton may be determined in other ways. For example, the joint detector may itself be trained to predict skeletons, in which case the joint estimation application 146 may input a received image into such a detector to determine skeleton(s) therein.

Figure 7:
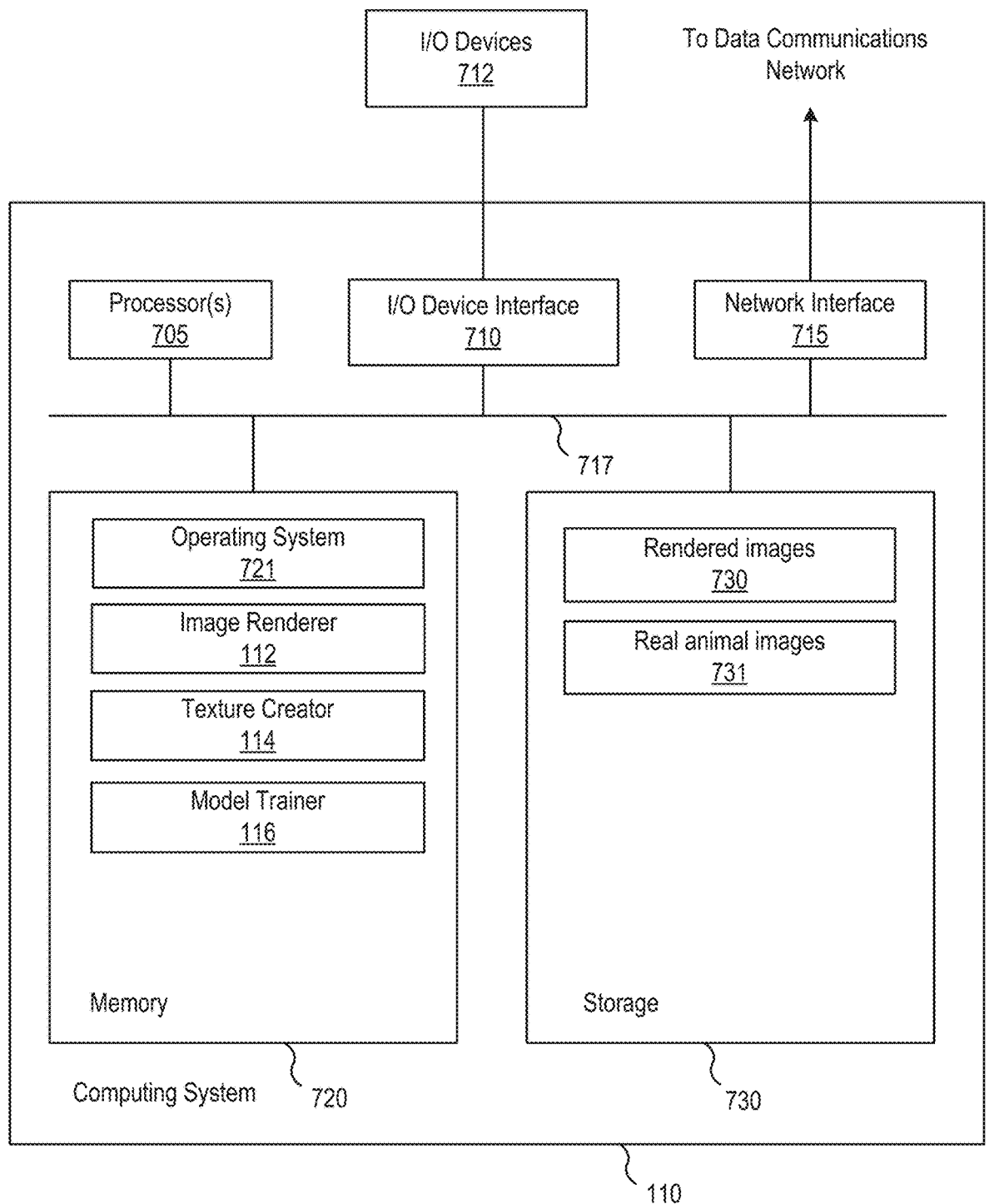
FIG. 7 illustrates a model generator computing system, according to an embodiment.

FIG. 7 illustrates the model generator 110 computing system, according to an embodiment. Although the model generator 110 is shown for illustrative purposes, the application server 130 may generally include similar components and run the joint estimation application 146, described above. The model generator 110 and application server 130 may also be the same computing system in some embodiments. As shown, the system 110 includes, without limitation, a central processing unit (CPU) 705, a network interface 715 connecting the system to a network 716, an interconnect 717, a memory 720, and storage 730. The system 110 may also include an I/O device interface 710 connecting I/O devices 712 (e.g., keyboard, display and mouse devices) to the system 110.

The CPU 705 retrieves and executes programming instructions stored in the memory 720. Similarly, the CPU 705 stores and retrieves application data residing in the memory 720. The interconnect 717 facilitates transmission, such as of programming instructions and application data, between the CPU 705, I/O device interface 710, storage 730, network interface 715, and memory 720. CPU 705 is included to be representative of a single CPU, multiple CPUs, a single CPU having multiple processing cores, one or more graphics processing units (GPUs), a combination of the above, and other types of processor(s). And the memory 720 is generally included to be representative of a random access memory. The storage 730 may be a disk drive storage device. Although shown as a single unit, the storage 730 may be a combination of fixed and/or removable storage devices, such as magnetic disk drives, flash drives, removable memory cards or optical storage, network attached storage (NAS), or a storage area-network (SAN). Further, system 110 is included to be representative of a physical computing system as well as virtual machine instance(s) hosted on underlying physical computing system(s). Further still, although shown as a single computing system, one of ordinary skill in the art will recognized that the components of the system 110 shown in FIG. 7 may be distributed across multiple computing systems connected by a data communications network.

As shown, the memory 720 includes an operating system 721, the image renderer 112, the texture creator 114, and the model trainer 116. The operating system 721 may be, e.g., Linux® or Microsoft Windows®. As described, the image renderer 112 is configured to render images depicting 3D virtual scenes, the model trainer 116 is configured to train machine learning models, and the texture creator 114 is configured to extract realistic textures of animals from, e.g., images generated artificially using a neural network function such as the generator of a trained CycleGAN. In one embodiment, the image renderer 112 may render into synthetic images 3D virtual scenes including an animal in multiple poses and various backgrounds, after which the model trainer 116 may train a CycleGAN using the synthetic images and real images of the animal as training data, the texture creator 114 may generate texture maps using the trained CycleGAN, and the model trainer 116 may further generate images depicting mosaics of body parts; train, using the images depicting mosaics of body parts and labeled locations of joints in those images, a detector that predicts joint locations; and (optionally) fine tune the detector using images depicting the animal and manually labeled joint locations in those images, according to the method 500 described above with respect to FIG. 5. Once the detector is trained, the joint estimation application 146 described above may determine poses in other images depicting the animal by processing those images using the trained detector to extract joint locations therein and inferring skeletons from the joint locations via, e.g., inverse kinematics, according to the method 600 described above.

Advantageously, techniques disclosed herein permit joints of animals and other articulated figures to be recognized in images. In particular, motions of animals can be learned from videos of real-world animals using techniques disclosed herein, in contrast to traditional animations of animals that were hand-crafted. Such learned motions may then be used to animate a 3D model of the animal in movie production, digital puppeteering, and other applications. For example, a running animation of a lion may be extracted from a video depicting a real lion running in the savannah, and the running animation may then be used in a controlling environment that permits a user to select and apply the running animation to move a 3D lion model in a virtual scene. By translating rendered synthetic images to more realistic images via adversarial learning prior to training a detector, techniques disclosed herein can reduce or eliminate texture bias. Further, by training the detector using rendered images depicting mosaics of body parts according to techniques disclosed herein, the detector may be capable of tracking many different motions, as predictions by the detector are not biased by the initial training data set.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for identifying poses in images, the method comprising:
rendering a plurality of training images, wherein each of the plurality of training images depicts distinct body parts of at least one figure, wherein each of the distinct body parts is associated with at least one joint location, and wherein each of the distinct body parts is a rendering of a portion of a first virtual model, wherein the portion is textured using a texture map determined via adversarial learning;
training a machine learning model using, at least in part, the plurality of training images and the at least one joint location associated with each of the distinct body parts in the plurality of training images;
processing an image using, at least in part, the machine learning model to determine joint locations in the image; and
inferring a skeleton based, at least in part, on the joint locations in the image, wherein the skeleton is used to animate the first virtual model or a second virtual model.

2. The computer-implemented method of claim 1, wherein the skeleton is inferred using, at least in part, inverse kinematics.

3. The computer-implemented method of claim 1, wherein determining the texture map via adversarial learning comprises:
training a cycle generative adversarial network (CycleGAN) using a plurality of rendered images depicting respective figures and a plurality of additional images depicting respective figures in the real world;
processing the plurality of rendered images using the trained CycleGAN, thereby generating corresponding processed images; and
generating the texture map using, at least in part, the corresponding processed images.

4. The computer-implemented method of claim 3, wherein generating the texture map comprises:
extracting a plurality of texture maps associated with the respective figures in the corresponding processed images; and
blending at least two of the plurality of texture maps.

5. The computer-implemented method of claim 4, wherein the at least two of the plurality of texture maps are further blended with at least one manually created texture map.

6. The computer-implemented method of claim 1, wherein the machine learning model is a multi-stage hourglass deep neural network.

7. The computer-implemented method of claim 1, wherein the distinct body parts are rendered with at least one of random positions, random orientations, random scales, random noisiness, random illumination, random blurriness, random occlusions, or random warpings.

8. The computer-implemented method of claim 1, wherein the at least one figure includes at least one animal.

9. A computer-implemented method for determining texture maps, comprising:
converting, using adversarial learning, a plurality of rendered images to corresponding images that include different textures than textures of the plurality of rendered images, each of the plurality of rendered images depicting a respective figure;
extracting one or more texture maps based, at least in part, on (a) the textures included in the corresponding images, and (b) pose and camera parameters used to render the plurality of rendered images; and
training a machine learning model using, at least in part, a plurality of training images, each training image depicting distinct body parts textured using at least one of the one or more texture maps, wherein the machine learning model is configured to determine joint locations in an image, wherein a skeleton is inferred based, at least in part, on the joint locations, wherein the skeleton is used to animate a first virtual model.

10. The computer-implemented method of claim 9, wherein:
the figure is an animal rendered using, at least in part, an initial texture map and the first virtual model or a second virtual model; and
converting the plurality of rendered images comprises:
training a cycle generative adversarial network (CycleGAN) using the rendered images and additional images depicting the animal in real life, and
processing the rendered images using the trained CycleGAN.

11. The computer-implemented method of claim 9, wherein the textures included in the corresponding images are used to reduce texture bias of the machine learning model relative to using the textures included in the plurality of rendered images.

12. The computer-implemented method of claim 9, wherein the figure is an animal rendered using, at least in part, a three-dimensional (3D) model and an initial texture map, and wherein the 3D model is rendered over a realistic background.

13. The computer-implemented method of claim 9, further comprising:
rendering the plurality of training images, wherein each of the distinct body parts is associated with at least one joint location;
and
processing the image using, at least in part, the machine learning model.

14. The computer-implemented method of claim 9, further comprising, inferring via inverse kinematics the skeleton based, at least in part, on the joint locations.

15. The computer-implemented method of claim 9, wherein the one or more texture maps includes a plurality of texture maps, and wherein the computer-implemented method further comprises:
blending at least two of the plurality of texture maps.

16. The computer-implemented method of claim 15, wherein the at least two of the plurality of texture maps are further blended with at least one manually created texture map.

17. A computer-implemented method for extracting poses from images, the computer-implemented method comprising:
receiving one or more images, each of the one or more images depicting a respective figure;
processing the one or more images using, at least in part, a machine learning model configured to determine joint locations in each of the one or more images, wherein the machine learning model is trained using a plurality of training images, each training image of the plurality of training images depicting a plurality of body parts, each body part of the plurality of body parts comprising a rendering of a portion of a first virtual model, wherein the portion is textured using a texture map determined via adversarial learning; and determining a motion by inferring a respective skeleton for each image of the one or more images based, at least in part, on the joint locations in each image, wherein the motion is used to animate the first virtual model or a second virtual model.

18. The computer-implemented method of claim 17, wherein inferring the respective skeleton is performed via inverse kinematics.

19. The computer-implemented method of claim 17, wherein the machine learning model is trained using a plurality of joint locations associated with the plurality of body parts depicted in each training image of the plurality of training images.

20. The computer-implemented method of claim 17, wherein the adversarial learning is used to convert a plurality of synthetic images to corresponding images that include different textures than textures of the plurality of synthetic images, and wherein the texture map is determined based, at least in part, on pose and camera parameters used to render the plurality of synthetic images.

\* \* \* \* \*